United States Patent
Pandey et al.

(10) Patent No.: US 8,068,467 B2
(45) Date of Patent: Nov. 29, 2011

(54) MULTI-TIER WLAN AND METHOD FOR PROPAGATING BEACONS IN A MULTI-TIER WLAN THEREOF

(75) Inventors: Aparna Pandey, Chicago, IL (US); Randy L. Ekl, Lake Zurich, IL (US); Christopher G. Ware, Chicago, IL (US)

(73) Assignee: Motorola Soulutions, Inc., Schaumburg, IL (US)

( * ) Notice: Subject to any disclaimer, the term of this patent is extended or adjusted under 35 U.S.C. 154(b) by 2043 days.

(21) Appl. No.: 10/971,293

(22) Filed: Oct. 22, 2004

(65) Prior Publication Data
US 2006/0098606 A1    May 11, 2006

(51) Int. Cl.
*H04W 4/00* (2009.01)
*H04L 12/56* (2006.01)
*H04J 3/06* (2006.01)
*H04W 40/00* (2009.01)

(52) U.S. Cl. ........ 370/338; 370/408; 370/503; 370/508; 370/509; 370/510; 455/449

(58) Field of Classification Search .................. 370/338, 370/503; 455/449
See application file for complete search history.

(56) References Cited

U.S. PATENT DOCUMENTS

| | | |
|---|---|---|
| 5,295,154 A | 3/1994 | Meier et al. |
| 6,980,810 B1 | 12/2005 | Gerakoulis et al. |
| 7,184,421 B1 | 2/2007 | Liu et al. |
| 7,340,247 B1 | 3/2008 | O'Hara, Jr. et al. |
| 2002/0075940 A1 | 6/2002 | Haartsen |
| 2002/0114303 A1* | 8/2002 | Crosbie et al. ................ 370/338 |
| 2004/0105414 A1 | 6/2004 | Narayanan et al. |
| 2004/0121749 A1 | 6/2004 | Cui et al. |
| 2004/0121774 A1 | 6/2004 | Rajkotia et al. |
| 2004/0185782 A1 | 9/2004 | Halford et al. |
| 2004/0228311 A1* | 11/2004 | Sugaya et al. ................ 370/338 |
| 2004/0233936 A1* | 11/2004 | Cheng ........................... 370/509 |
| 2005/0009565 A1 | 1/2005 | Kwak |
| 2005/0047383 A1 | 3/2005 | Yoshida |
| 2005/0053043 A1 | 3/2005 | Rudolf et al. |
| 2005/0058117 A1 | 3/2005 | Morioka et al. |
| 2005/0128988 A1 | 6/2005 | Simpson et al. |
| 2005/0192037 A1 | 9/2005 | Nanda et al. |
| 2005/0221838 A1 | 10/2005 | Cha et al. |

(Continued)

FOREIGN PATENT DOCUMENTS

KR    1020040085719 A    10/2004

(Continued)

OTHER PUBLICATIONS

PCT/US05/35846—EPC International Search Report, mailed Mar. 21, 2006—8 pages.

(Continued)

*Primary Examiner* — Patrick N Edouard
*Assistant Examiner* — Huy Ho
(74) *Attorney, Agent, or Firm* — Randi L. Karpinia (57) ABSTRACT

A method for transmitting beacons by nodes in a multi-tier wireless local area network is disclosed. First, a first beacon by a tier 1 node in the multi-tier wireless local area network is transmitted. Then, a second beacon by a tier 2 node is transmitted where the second beacon is transmitted based upon the time that the first beacon is sent by the tier 1 node.

15 Claims, 4 Drawing Sheets

U.S. PATENT DOCUMENTS

| | | |
|---|---|---|
| 2005/0282546 A1 | 12/2005 | Chang et al. |
| 2006/0009246 A1 | 1/2006 | Marinier et al. |
| 2006/0274792 A1* | 12/2006 | Abhishek et al. ............. 370/913 |
| 2007/0191016 A1 | 8/2007 | Beasley et al. |

FOREIGN PATENT DOCUMENTS

| | | |
|---|---|---|
| WO | 2005074212 A1 | 8/2005 |

OTHER PUBLICATIONS

PCT/US05/36157—EPC International Search Report for U.S. Appl. No. 10/970,940, mailed Mar. 21, 2006—8 pages.

USA Office Action dated Apr. 1, 2008 for U.S. Appl. No. 10/970,940—12 pages.

USA Office Action dated Oct. 6, 2008 for U.S. Appl. No. 10/970,940—13 pages.

KIPO Notice of Preliminary Rejection (English Translation) dated Dec. 29, 2008.

Noted as Cited Reference 2: in KIPO Preliminary Rejection English Translation of the Summary—H. Y. Kwon et al., "Technical Trends on Mobile Ad-Hoc Networks"—Analysis of Electronic Communication Trends, vol. 18, No. 2, Apr. 2003, pp. 11-24.

Corresponding German Patent Application No. 11 2005 002 588.8-31—Office Action dated Sep. 14, 2010—10 pages.

* cited by examiner

MULTI-TIER WLAN AND METHOD FOR PROPAGATING BEACONS IN A MULTI-TIER WLAN THEREOF

REFERENCE TO RELATED APPLICATIONS

The present application is related to the following U.S. application commonly owned together with this application by Motorola, Inc.: United States Publication Number US-2006-0089964-A1, filed Oct. 22, 2004, and published on Apr. 27, 2006, titled "Method for Performing Neighbor Discovery in a Multi-tier WLAN" by Pandey.

FIELD OF THE INVENTION

The present invention relates generally to wireless communication systems and in particular to the field of beacon propagation in wireless local area networks.

BACKGROUND OF THE INVENTION

Beacons are packets transmitted in a wireless local area network (WLAN) to communicate information about the WLAN and to communicate information about the capabilities of the sender. In general, IEEE standards relating to WLANs define how beacons may be transmitted in a single-tier WLAN but do not adequately address multi-tier WLANs. Further, the IEEE standards address how each individual node in the WLAN transmits a beacon without considering the relationship of beacons being transmitted by a number of nodes. Thus, there is not much synchronization between multiple nodes transmitting beacons. Because there is not much synchronization of multiple nodes transmitting beacons, nodes in a multi-tier WLAN may spend a lot of time performing a scan of neighbors, may not efficiently receive traffic, and may ultimately not see neighboring nodes. Because of this lack of synchronization, nodes in a multi-tier WLAN may consume unnecessary power and waste unnecessary capacity. Accordingly, there exists a need for an improved method of propagating beacons in a wireless local area network.

BRIEF DESCRIPTION OF THE FIGURES

A preferred embodiment of the invention is now described, by way of example only, with reference to the accompanying figures in which.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION

Figure 1:
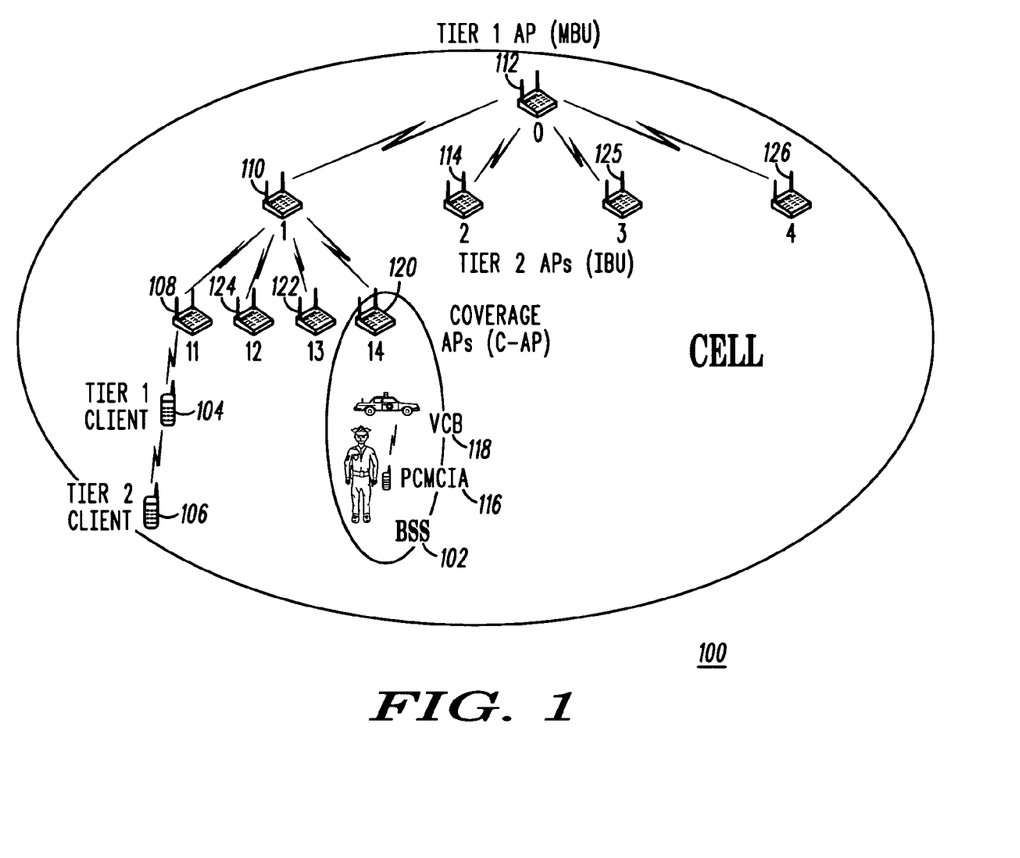
FIG. 1 is an example block diagram illustrating a typical wireless local area network system in accordance with an embodiment of the invention.

An embodiment of the present invention is described with reference to FIG. 1. Shown in FIG. 1 is a multi-tier wireless local area network (WLAN) 100. The invention may be thought of as a multi-tier WLAN and/or be embodied in a multi-tier WLAN. The WLAN is termed multi-tier to specify that there are multiple tiers of nodes, e.g. multiple tiers of access points (APs) and/or multiple tiers of clients, where a node is a well known term in the art and means a client or an access point. On the AP side of the multi-tier WLAN communications hierarchy, a single AP 112 communicates with APs in a second tier 110, 114, 125, 126. In an exemplary embodiment, the tier 1 AP 112 is termed a master backhaul unit (MBU) and provides communications to a wired network (not shown). As shown in FIG. 1, the second tier APs 110, 114, 125, 126 communicate with coverage APs and are termed intermediate backhaul units (IBUs). Although only two tiers of APs are shown in FIG. 1, many more tiers of APs may exist and are considered to be obvious extensions of FIG. 1. For example, a multi-tier WLAN may comprise tier 1, tier 2, tier 3, and tier 4 APs. In any case, the coverage APs communicate with the clients of the multi-tier WLAN where the clients may also be tiered.

The distinction between coverage APs and tiered APs, e.g. tier 1 AP or tier 2 AP, is that a coverage AP interfaces with the clients of the multi-tier WLAN and the tiered APs are the intermediaries of a communication between the clients in the multi-tier WLAN. In an alternate embodiment, the functionality provided by a tiered AP may be combined into a coverage AP, and vice versa, so one AP, whether tiered or coverage, may provide both functions.

On the client side of the multi-tier WLAN communications hierarchy, a tier 1 client communicates directly with a single coverage AP to provide access to the wired network (not shown) or to the rest of the wireless multi-tier WLAN communications hierarchy. In a second tier, a tier 2 client communicates with a tier 1 client to access a coverage AP. The tier that a client is a part of specifies the number of hops that the client is away from a coverage AP. For example, a tier 2 client is two hops away from a coverage AP. Although only two tiers of clients are shown in FIG. 1, many more tiers of clients may exist. In any case, the clients of the multi-tier WLAN communicate with the coverage APs of the multi-tier WLAN. Further, a single coverage AP and all the clients associated with the coverage AP is termed a basic service set (BSS), e.g. BSS 102 in FIG. 1. As used herein, the coverage AP that a client is associated with is termed a serving coverage AP.

Even though both a tier of APs and a tier of clients are shown in FIG. 1, an embodiment of the present invention is contemplated to work in other environments where either the tier of APs or the tier of clients is missing in the multi-tier WLAN. For example, an embodiment of the present invention is contemplated to work in an ad-hoc network where only clients exist where the clients form a temporary network without the aid of any centralized administration or standard support services. Another example, an embodiment of the present invention is contemplated to work in a network where only APs exist where the APs form the backhaul of the network.

As will be appreciated by those of skill in the art, the clients may be any suitable type of wireless communications device capable of communicating within an ad-hoc network, such as computers, personal data assistants (PDAs), fixed mounted devices, vehicular mounted devices, or handheld devices, as well as others. Certain of the clients may also be connected to a fixed communications infrastructure, if desired.

Figure 2:
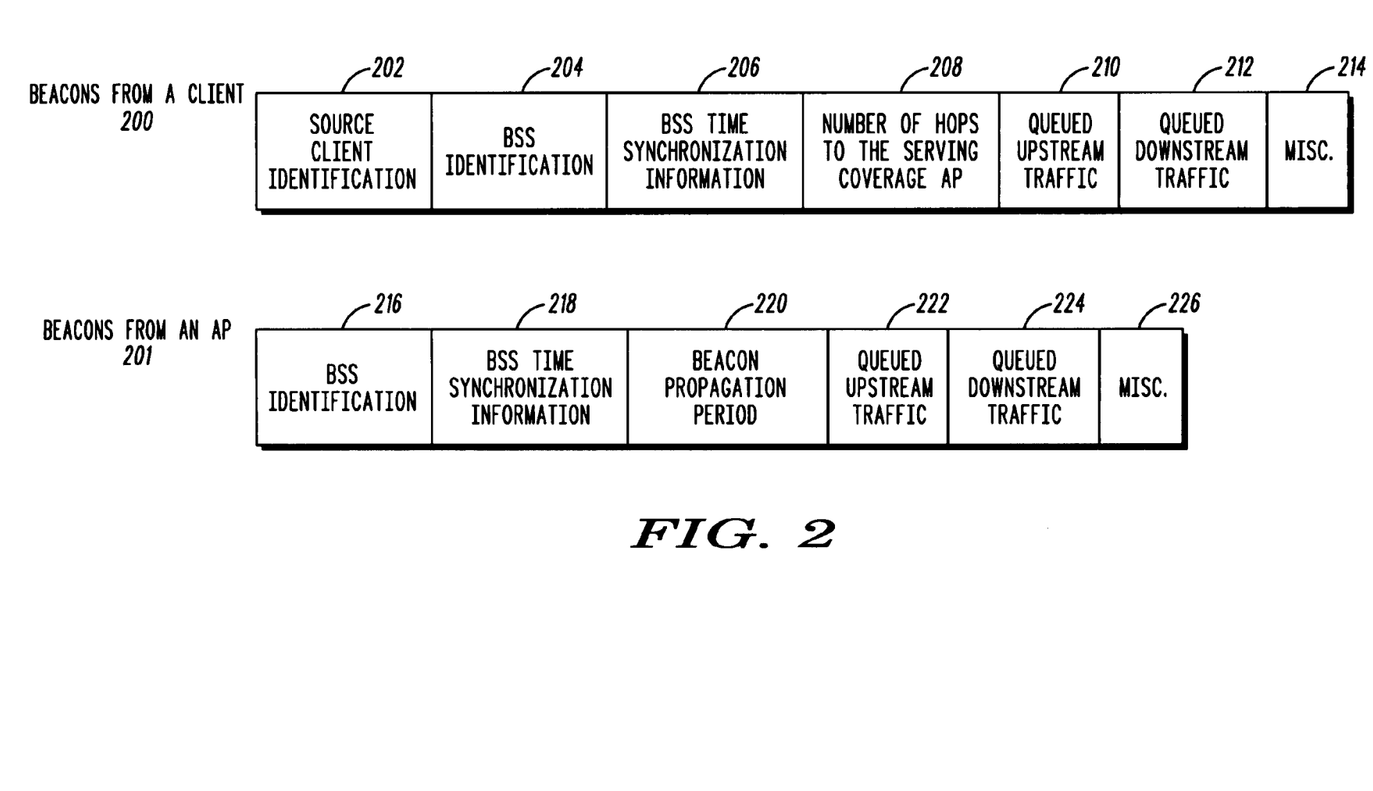
FIG. 2 illustrates example beacons in accordance with an embodiment of the invention.
Figure 3:
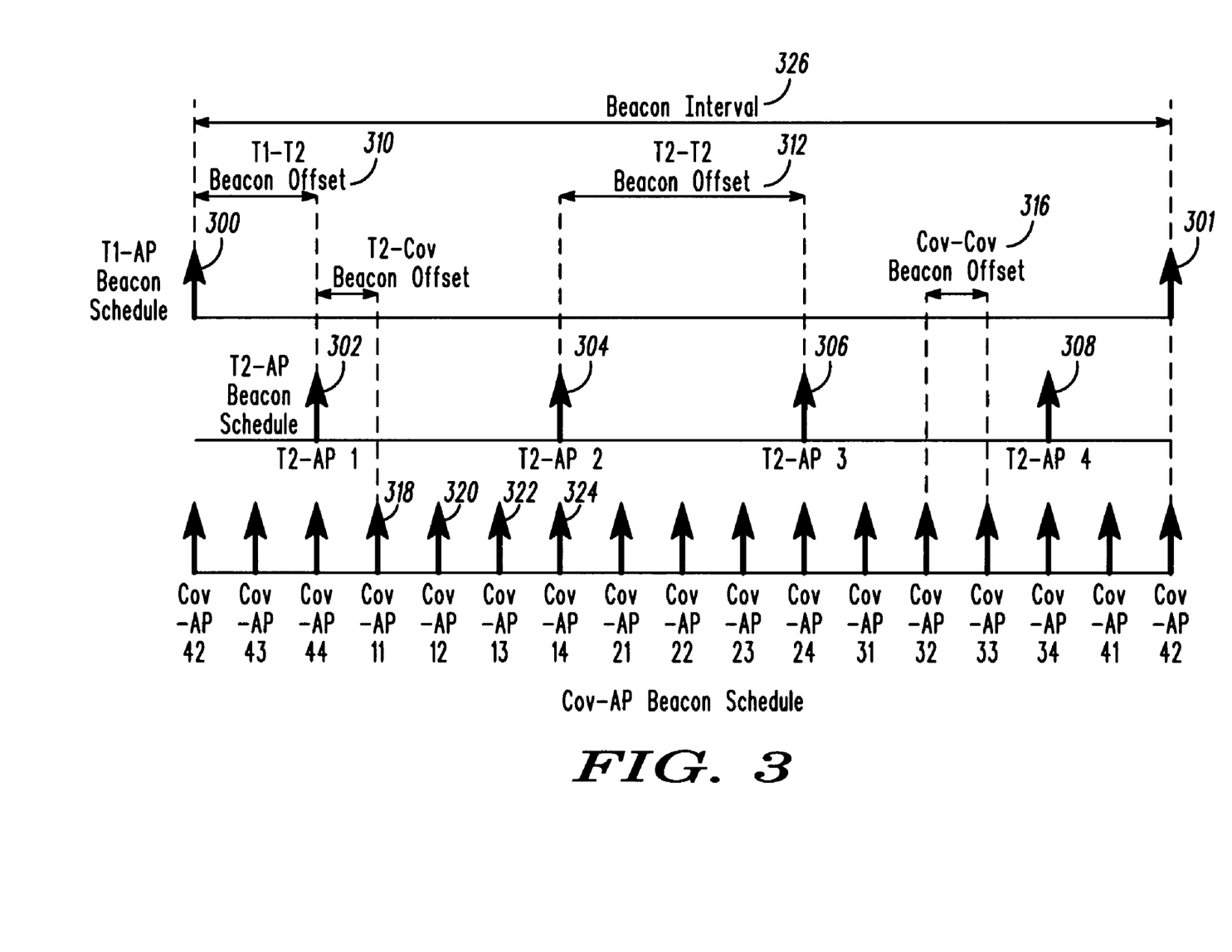
FIG. 3 is a timing diagram illustrating a beacon propagation schedule in accordance with an embodiment of the invention.

Beacons are defined as packets transmitted by an AP, whether tiered or coverage, and/or clients in the multi-tier WLAN that have information about the multi-tier WLAN such as timing synchronization, traffic queues, and the capabilities of the sender, e.g. the AP. For example, as shown in FIG. 2, an illustrative beacon 200 sent from a client and an illustrative beacon 201 sent from an access point are shown. In such an embodiment and as known in the IEEE 802.11 art, beacons transmitted by an AP are transmitted once every beacon interval where a beacon interval is defined as the time between consecutive beacons transmitted by a tier 1 AP, e.g. 300, 301 as shown in FIG. 3. Beacons transmitted by a single AP have a fixed frequency but may or may not be the same frequency with which beacons are transmitted by a different AP. For example, in FIG. 1, tier 1 AP 112 transmits beacons at one rate and tier 2 AP 110 may transmit beacons at a different rate. Further, beacons transmitted by tier 2 AP 114 may be transmitted at yet a different rate. Beacons are transmitted across the multiple tiers of APs and multiple tiers of clients using a beacon propagation schedule, as will be explained later with reference to FIGS. 3 and 4.

Further, in such an embodiment, the clients in the multi-tier WLAN 100 also transmit beacons similar to the beacons transmitted by an AP. Such beacons are transmitted during a beacon propagation period that is a pre-designated time corresponding to either a controlled access period (CAP) or a contention period (CP) which immediately follows a serving coverage AP's beacon. In an exemplary embodiment, the beacons from the clients are transmitted during the CAP. Preferably, the beacon propagation period is a protected time where protected means that traffic other than beacons shall not be transmitted during the beacon propagation period.

Even though this description makes a distinction between beacons sent from APs (e.g. beacon 201) and beacons sent from clients (e.g. beacon 200), in practice, these beacons may adhere to the same protocol and contain the same parameters. For example, both beacons from APs and beacons from clients have information about the multi-tier WLAN 100 including timing synchronization (e.g. beacon fields 206, 218) and traffic (e.g. beacon fields 210, 212, 222, 224) Thus, as used herein, the term "beacon" encompasses beacons sent from an AP and beacons sent from a client. Further, beacons transmitted by clients may contain additional information including the number of hops to a serving coverage AP (e.g. beacon field 208), a BSS identification (e.g. beacon field 204), and a client identification (e.g. beacon field 202 such as a MAC address of the client). Also, in one embodiment, beacons may further include information about pending traffic (e.g. beacon fields 210, 212, 222, 224) where traffic is defined as handling the communications between clients and or APs of the multi-tier WLAN. For example, if a coverage AP has pending traffic to be transmitted to a client then the beacon that is transmitted to the client may indicate that there is pending traffic for the client. Thus, the client receiving the beacon will know to listen to the coverage AP for a longer duration in order to retrieve the traffic that is meant for it. In addition, the beacon may indicate the direction of the pending traffic, e.g. whether the pending traffic is for an upstream direction (e.g. beacon fields 210, 222) or the pending traffic is for a downstream direction (e.g. beacon fields 212, 224). Before an embodiment of this invention, a beacon having this additional information was not known.

In embodiments of the present invention, the frequency with which beacons are transmitted by clients in the multi-tier WLAN may be variable based on a number of factors including the number of hops to a serving coverage AP and if one or more higher tier neighboring clients are supported. In one embodiment, the clients may transmit beacons less frequently than the APs may transmit beacons and the lower tier clients may transmit beacons more frequently than higher tier clients. For example, a lower tier client, such as client 104, which supports higher tier clients, such as client 106, may transmit beacons more frequently than other clients in the multi-tier WLAN 100. Since the clients at a higher tier are further away from the serving coverage AP, than a client at a lower tier is supporting the higher tier client and all the traffic between serving coverage AP and the higher tier client is transmitted via the lower tier client.

The time that the client's serving coverage AP sends its beacon is known to the client and the process for informing the client of the time that the client's serving coverage AP sends its beacon is a part of the IEEE 802.11 standard. In an illustrative embodiment of the present invention, the beacon (e.g. beacon 201) from the client's serving coverage AP comprises an information field which tells the client when the beacon propagation period (e.g. beacon field 220) is available for it and other clients in the BSS. Knowing the beacon propagation period gives the client an indication of when a beacon is likely to be transmitted by the other clients in the client's serving coverage AP, e.g. the BSS. Before an embodiment of this invention, a beacon (e.g. beacon 201) indicating the beacon propagation period was not known. In an illustrative embodiment, the beacon propagation period immediately follows the time that a beacon is received from the client's serving coverage AP. Other embodiments may be implemented where the beacon propagation period follows the time that a beacon is received from the client's serving coverage AP after a delay.

Further, in an exemplary embodiment, the coverage AP and all its associated clients in the BSS are on one channel and they communicate with each other on that channel. In alternative embodiments, the BSS may be served by more than one channel and all the clients communicate on all the channels associated with the BSS.

In an embodiment of the present invention, a client does not have to spend much time finding the correct channel or the expected beacon arrival time and thus does not have to spend much time in finding its neighbors and relevant information about the multi-tier WLAN. Thus, the client is able to save power, while information about the multi-tier WLAN is revealed via neighboring clients' beacons, and unnecessary collisions not caused.

Shown in FIG. 3 is a beacon propagation schedule where beacons are sent at offsets from when a beacon is sent from a tier 1 AP. Assume that a beacon is sent from a tier 1 AP at a target beacon transmission time ($TBTT_i$) which is shown as beacons 300, 301 in FIG. 3. Using the $TBTT_i$ for the tier 1 AP as a reference, the times that tier 2 APs transmit beacons, namely $TBTT_{i,j}$, can be described using the following formula.

$$TBTT_{i,j} = TBTT_i + BCN\_OFST_{T1,T2} + (j-1) * BCN\_OFST_{T2,T2} \quad (1)$$

where, i=1, 2, . . . , the number of tier 1 APs in the multi-tier WLAN;

j=1, 2, . . . , the number of tier 2 APs in the multi-tier WLAN

In a preferred embodiment, there is only one tier 1 AP in the WLAN and the value of i is set to be an identifier of the tier 1 AP. Also, the value of "j" in known to each tier 2 AP either implicitly or via explicit signaling from the tier 1 AP. In one embodiment, the value of "j" may also determine the channel number of a specific tier 2 AP.

Further, $BCN\_OFST_{T1,T2}$ is a predesignated number chosen to allow all the tier 2 APs associated with the tier 1 AP time to receive the beacon from the tier 1 AP and is shown as time 310 in FIG. 3. The value of $BCN\_OFST_{T1,T2}$ is known to all the tier 2 APs. In one embodiment, the value of BCN_OF- $ST_{T1,T2}$ is communicated in the beacon or other signaling means sent by the tier 1 AP. In an illustrative embodiment, $BCN\_OFST_{T1,T2}$ is set to be the time between two consecutive beacons sent by the same tier 1 AP divided by the number of tier 2 APs and is shown as time 312 in FIG. 3. Further, $BCN\_OFST_{T2,T2}$ is known to the tier 2 APs either implicitly or explicitly. For example, in one embodiment, the value of $BCN\_OFST_{T2,T2}$ is communicated in a beacon or other signaling means sent by the tier 1 AP. In another embodiment, the total number of tier 2 APs in the cell is communicated in a beacon or other signaling means sent by the tier 1 AP.

From Equation 1, it can be calculated that beacons are sent from one tier 2 APs at times 302, 304, 306, and 308, as shown in FIG. 3. For example, for beacon 302, the TBTT is $TBTT_{1,1}=TBTT_1+BCN\_OFST_{T1,T2}$. For beacon 304, the TBTT is $TBTT_{1,2}=TBTT_1+BCN\_OFST_{T1,T2}+BCN\_OFST_{T2,T2}$. For beacon 306, the TBTT is $TBTT_{1,3}=TBTT_1+BCN\_OFST_{T1,T2}+2BCN\_OFST_{T2,T2}$. For beacon 308, the TBTT is $TBTT_{1,3}=TBTT_1+BCN\_OFST_{T1,T2}+3BCN\_OFST_{T2,T2}$.

Using the $TBTT_{i,j}$ for the tier 2 APs as a reference, the time that coverage APs transmit beacons, namely $TBTT_{i,j,k}$, can be described using the following formula.

$$TBTT_{i,j,k}=TBTT_{i,j}+BCN\_OFST_{T2,Cov}+(k-1)*BCN\_OFST_{Cov,Cov} \quad (2)$$

where, i=1, 2, . . . , the number of tier 1 APs in the multi-tier WLAN;

j=1,2, . . . , the number of tier 2 APs in the multi-tier WLAN;

k=1,2, . . . , the number of coverage APs in the multi-tier WLAN.

As mentioned above, in a preferred embodiment, there is only one tier 1 AP in the multi-tier WLAN and the value of i is set to be an identifier of the tier 1 AP. Further, j is set to be an identifier of the tier 2 AP associated with the coverage AP. Also, the value of "k" is known to each coverage AP either implicitly or via explicit signaling from the tier 2 AP. In one embodiment, the value of "k" shall determine the channel number of a specific coverage AP.

Further, $BCN\_OFST_{T2,Cov}$ is a predesignated number chosen to allow all the coverage APs ample time to receive the beacon from their respective tier 2 APs and is shown as time 314 in FIG. 3. The value of $BCN\_OFST_{T2,Cov}$ is known to all the coverage APs in the multi-tier WLAN. In one embodiment, the value of $BCN\_OFST_{T2,Cov}$ is communicated in the beacon or other signaling means sent by the tier 2 AP. In an illustrative embodiment, $BCN\_OFST_{Cov,Cov}$ may be set to be the time between two beacons sent by the same tier 1 AP divided by the number of coverage APs in a given cell and is shown as time 316 in FIG. 3. Further, $BCN\_OFST_{Cov,Cov}$ is known to the tier 2 APs either implicitly or explicitly. For example, in one embodiment, the value of $BCN\_OFST_{Cov,Cov}$ is communicated in a beacon or other signaling means sent by the tier 2 AP. In another embodiment, the total number of coverage APs in the cell is communicated in a beacon or other signaling means sent by the tier 2 AP.

From Equation 2, it can be calculated that beacons are sent from coverage APs associated with a single tier 2 AP at times 318, 320, 322, 324, as shown in FIG. 3. Each of the times 318, 320, 322, 324 are calculated as an offset from the time that a beacon is sent from the tier 2 AP, e.g. $TBTT_{1,1}$ at time 302. For example, for beacon 318, the TBTT is $TBTT_{1,1,1}=TBTT_{1,1}+BCN\_OFST_{T2,Cov}$. For beacon 320, the TBTT is $TBTT_{1,1,2}=TBTT_{1,1}+BCN\_OFST_{T2,Cov}+BCN\_OFST_{Cov,Cov}$. For beacon 322, the TBTT is $TBTT_{1,1,3}=TBTT_{1,1}+BCN\_OFST_{T2,Cov}+2BCN\_OFST_{Cov,Cov}$. For beacon 324, the TBTT is $TBTT_{1,1,3}=TBTT_{1,1}+BCN\_OFST_{T2,Cov}+3BCN\_OFST_{Cov,Cov}$. Thus, the beacons sent from the coverage APs in the multi-tier WLAN are sent at separate times and are not overlapped.

In the embodiment of FIG. 3, beacons sent from each coverage AP in the multi-tier WLAN are sent on separate channel numbers. Each of the beacons 318, 320, 322, and 324 are each sent on a channel number associated with the corresponding coverage AP, namely coverage APs 108, 124, 122, and 120. Thus, as shown in FIG. 1, coverage AP A1 108 is associated with a different frequency than coverage AP B1 124. Similarly each of the clients 104, 106 associated with coverage AP A1 108 are communicating on a different frequency than the clients associated with coverage AP B1 124.

It will be obvious to those skilled in the art that the beacon propagation schedule can include dummy TBTTs to enable future increase of the number of tier 2 APs and/or coverage APs in a cell with minimal efficiency loss. For example, a multi-tier WLAN similar to that shown in FIG. 1 without tier 2 AP 126 may have a beacon propagation schedule with time to send beacon 308 but such time is not necessary as tier 2 AP 126 does not exist in the multi-tier WLAN. If, however, tier 2 AP 126 is added to the multi-tier WLAN then the beacon propagation schedule could accommodate the change efficiently.

Figure 4:
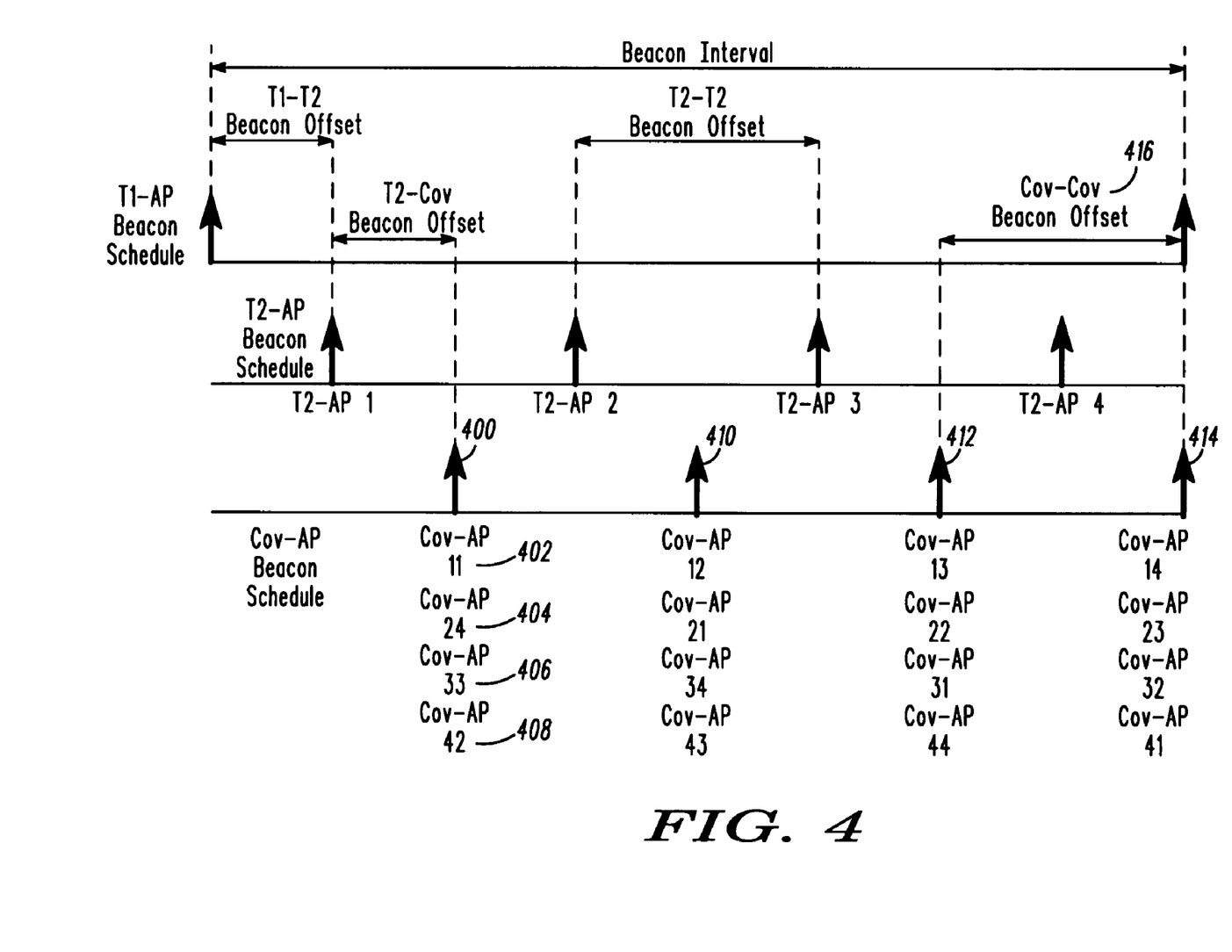
FIG. 4 is a timing diagram illustrating an alternative beacon propagation schedule in accordance with an embodiment of the invention.

In an alternate embodiment, as shown in FIG. 4, some beacons sent from some of the coverage APs in the multi-tier WLAN are overlapped. For example, beacons 402, 404, 406, and 408 are sent at one predetermined time and on channel numbers associated with the given coverage AP. For the architecture as shown in FIG. 1, there may be four predetermined times 400, 410, 412, 414 in which coverage APs can send their beacons. Having overlapped beacons from the coverage APs has the advantage that clients may not need to know a specific channel number to receive a beacon. A client knowing that it is time to receive a beacon from a coverage AP can scan to any channel in the multi-tier WLAN at the predetermined given time and will likely receive a beacon from a coverage AP. In such an embodiment where there are overlapping beacons, the $BCN\_OFST_{Cov,Cov}$ as described in Equation 2 may be set to be the time between two consecutive beacons sent by the same tier 2 AP divided by the number of coverage APs and is shown as time 416 in FIG. 3.

Further, each coverage AP is associated with one channel and the clients associated with the coverage AP are associated with the same channel. Thus, in the architecture of FIG. 1, coverage AP 11 108 is associated with one channel, coverage AP 12 124 is associated with a second channel, coverage AP 13 122 is associated with a third channel, and coverage AP 14 120 is associated with a fourth channel. This pattern is repeated over coverage APs belonging to different tier 2 APs. Therefore, calculating the channel number of a coverage AP is shown in FIG. 2 Block 212 and as below.

$$Ch\_num=(Serving\ Cov\text{-}AP\ Ch\_num+n) \bmod (Total\_num\_channels) \quad (3)$$

where chan_num=0, 1, 2, . . . , (Total_num_channels−1);

n=1, 2, 3, . . . , Total_num_Cover-APs/cell.

Further, a client can learn the channel number of all the coverage APs within a cell with respect to its own serving AP's channel number. In addition, the client can map a given estimated TBTT of a coverage AP to its channel number, both by using its serving coverage AP's TBTT and channel number as a reference. For example, if the serving coverage AP's channel number is 2 and its TBTT is TBTT2, then the client can expect a second coverage AP in the cell to transmit a beacon at TBTT2+1*BCN_OFST$_{Cov,Cov}$ on channel number 3, a third coverage AP to transmit a beacon at TBTT2+2*BCN_OFST$_{Cov,Cov}$ on channel number 0, a fourth coverage AP to transmit a beacon at TBTT2+3*BCN_OFST$_{Cov,Cov}$ on channel number 1, a fifth coverage AP to transmit a beacon at TBTT2+4*BCN_OFST$_{Cov,Cov}$ on channel number 2 and so on. Note that it is obvious to one of ordinary skill in the art that the above scheme can be easily extended to include multi-tier WLANs where the total number of channels and/or coverage APs per tier 2 AP is greater than or less than four. Also, the channel numbering is used only to indicate a given order of channel allocation with respect to the beacon transmission order. In other words, channel number 0 may not necessarily be less than channel number 1, 2, or 3 and channel numbers 0,1,2 and 3, when physically translated to a channel may not be in strictly ascending or descending order.

As mentioned previously, in the alternate embodiment of FIG. 4, the beacons are transmitted in an overlapped manner, such that there are fewer options for estimated TBTTs. Further, at each such time, beacons are transmitted in all of the four channel numbers by the coverage APs. For example, beacon 402 is transmitted at channel number 1, beacon 404 is transmitted at channel number 2, beacon 406 is transmitted at channel number 3 and beacon 408 is transmitted at channel number 0. Therefore, a client receiving beacons according to the beacon propagation schedule of FIG. 4 need not know the channel ordering but the client will need to be able to estimate the TBTT options. Again, as mentioned above, it is obvious to one of ordinary skill in the art, that this scheme can also be easily extended to include multi-tier WLANs with fewer or more than four channels.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

We claim:

1. A method for transmitting beacons by a coverage access point and one or more clients in a multi-tier wireless local area network, wherein the multi-tier wireless local area network comprises at least one coverage access point and a plurality of multi-tiered clients, the method comprising:

transmitting a first beacon by the coverage access point in the multi-tier wireless local area network, wherein the coverage access point provides coverage to the plurality of multi-tiered clients;

transmitting a first client beacon by at least one of the plurality of multi-tiered clients during a beacon propagation period, wherein the beacon propagation period is a protected time and suspending transmission of traffic other than one or more client beacons during the beacon propagation period.

2. The method of claim 1 wherein the multi-tier wireless local area network comprises at least one tier 1 access point, at least one tier 2 access point, and at least one tier 3 access point, and wherein the coverage access point comprises a tier 3 access point, the method further comprising:

transmitting a second beacon by a tier 2 access point prior to transmitting the first beacon by the coverage access point, wherein the first beacon is transmitted by the coverage access point based upon the time that the second beacon is transmitted by the tier 2 access point and a first beacon offset value, wherein the first beacon offset value is included in the second beacon transmitted by the tier 2 access point.

3. The method of claim 1 further comprising:

transmitting a second beacon by a tier 1 access point; and transmitting a third beacon by a tier 2 access point, wherein the third beacon is transmitted by the tier 2 access point based upon the time that the second beacon is sent by the tier 1 access point and a second beacon offset value, wherein the second beacon offset value is included in the second beacon transmitted by the tier 1 access point.

4. The method of claim 2, wherein the second beacon further comprises a quantity of coverage access points attached to it, and further wherein the step of transmitting the first beacon takes into account the quantity of coverage access points.

5. The method of claim 4 wherein the step of transmitting the first beacon further comprises waiting a time equal to TBTT$_{i,j}$+BCN_OFST$_{T2,Cov}$+(k−1)*BCN_OFST$_{Cov,Cov}$. where:

TBTT$_{i,j}$=the times that one or more tier 2 access points transmit beacons,

BCN_OFST$_{T2,Cov}$=a predesignated number chosen to allow all the coverage access points time to receive the beacon from their respective tier 2 access points, BCN_OFST$_{Cov,Cov}$=a predesignated number associated with the coverage access point, i=1, 2, . . . , a number of tier 1 access points in the multi-tier WLAN, j=1,2, . . . , a number of tier 2 access points in the multi-tier WLAN, and k=1,2, . . . , the number of coverage access points in the multi-tier WLAN.

6. The method of claim 3, wherein the third beacon further comprises a quantity of tier 2 access points, and further wherein the step of transmitting a second beacon takes into account the quantity of tier 2 access points.

7. The method of claim 6 wherein the step of transmitting the second beacon further comprises waiting a time equal to TBTT$_i$+BCN_OFST$_{T1,T2}$+(j−1)*BCN_OFST$_{T2,T2}$ where:

TBTT$_i$=a target beacon transmission time

BCN_OFST$_{T1,T2}$=a predesignated number chosen to allow all the tier 2 access points associated with the tier 1 access point time to receive the beacon from the tier 1 access point, BCN_OFST$_{T2,T2}$=a predesignated number associated with one or more tier 2 access points, i=1, 2, . . . , a number of tier 1 access points in the multi-tier WLAN, and j=1, 2, ..., a number of tier 2 access points in the multi-tier WLAN.

8. The method of claim 1 wherein the first beacon further comprises an information field indicating the beacon propagation period.

9. The method of claim 1 wherein the first beacon further comprises an information field comprising information about pending traffic including one or more of a destination of a pending traffic and a direction of the pending traffic, for clients associated with the coverage access point.

10. The method of claim 8 wherein the first client beacon comprises an information field including one or more information selected from a group comprising a quantity of hops to the tier 1 access point, a basic service set identification, a client identification, and a direction of pending traffic.

11. The method of claim 1 wherein the beacon propagation period is a pre-designated time corresponding to a controlled access period.

12. The method of claim 1 wherein a frequency with which the client beacon is transmitted by a client is variable, and wherein the variable frequency is based upon one or more factors selected from a group comprising a number of hops to the coverage access point, and a relative tier of the client compared to other clients served by the coverage access point.

13. The method of claim 1, further comprising:
transmitting a first client beacon by a tier 1 client in the multi-tier wireless local area network, wherein the first client beacon includes a beacon offset value; and
transmitting a second client beacon by a tier 2 client based upon the time that the first beacon is sent by the tier 1 client and the beacon offset value.

14. A multi-tier wireless local area network comprising:
a plurality of multi-tiered access points including at least one tier 1 access point, at least one tier 2 access point, and at least one tier 3 access point, wherein a tier 3 coverage access point provides coverage to a plurality of multi-tiered clients, wherein the tier 3 coverage access point transmits at first beacon; and
the plurality of multi-tiered clients, wherein at least one of the plurality of multi-tiered clients transmits a first client beacon during a beacon propogation period, wherein the beacon propagation period is a protected time in which transmission of traffic other than one or more client beacons is suspended.

15. A multi-tier wireless local area network comprising:
a single tier access point, wherein the single tier access point provides coverage to a plurality of multi-tiered clients, wherein the single tier access point transmits a first beacon; and
the plurality of multi-tiered clients, wherein at least one of the plurality of multi-tiered clients transmits a first client beacon during a beacon propogation period, wherein the beacon propagation period is a protected time in which transmission of traffic other than one or more client beacons is suspended.

* * * * *

UNITED STATES PATENT AND TRADEMARK OFFICE
CERTIFICATE OF CORRECTION

| | | |
|---|---|---|
| PATENT NO. | : 8,068,467 B2 | Page 1 of 1 |
| APPLICATION NO. | : 10/971293 | |
| DATED | : November 29, 2011 | |
| INVENTOR(S) | : Pandey et al. | |

It is certified that error appears in the above-identified patent and that said Letters Patent is hereby corrected as shown below:

In Column 8, Lines 2-3, in Claim 1, delete "propogation" and insert -- propagation --, therefor.

In Column 8, Line 4, in Claim 1, delete "time" and insert -- time; --, therefor.

In Column 8, Line 37, in Claim 5, delete "$BCN\_OFST_{Cov,Cov}$." and insert
-- $BCN\_OFST_{Cov,Cov}$, --, therefor.

In Column 8, Line 59, in Claim 7, delete "time" and insert -- time, --, therefor.

In Column 10, Line 13, in Claim 14, delete "propogation" and insert -- propagation --, therefor.

In Column 10, Line 24, in Claim 15, delete "propogation" and insert -- propagation --, therefor.

Signed and Sealed this
Eleventh Day of December, 2012

David J. Kappos
*Director of the United States Patent and Trademark Office*